United States Patent
Jalali (10) Patent No.: US 9,807,569 B2
(45) Date of Patent: Oct. 31, 2017

(54) LOCATION BASED SERVICES PROVIDED VIA UNMANNED AERIAL VEHICLES (UAVS)

(71) Applicant: Ahmad Jalali, Rancho Santa Fe, CA (US)

(72) Inventor: Ahmad Jalali, Rancho Santa Fe, CA (US)

(73) Assignee: UBIQOMM, INC, San Diego, CA (US)

( * ) Notice: Subject to any disclaimer, the term of this patent is extended or adjusted under 35 U.S.C. 154(b) by 327 days.

(21) Appl. No.: 14/533,756

(22) Filed: Nov. 5, 2014

(65) Prior Publication Data

US 2017/0041763 A1 Feb. 9, 2017

Related U.S. Application Data

(60) Provisional application No. 61/940,805, filed on Feb. 17, 2014, provisional application No. 61/946,575, filed on Feb. 28, 2014.

(51) Int. Cl.
*H04W 24/00* (2009.01)
*H04W 4/04* (2009.01)
(Continued)

(52) U.S. Cl.
CPC ............... *H04W 4/046* (2013.01); *G01S 5/02* (2013.01); *G01S 5/14* (2013.01); *G01S 13/876* (2013.01);
(Continued)

(58) Field of Classification Search
CPC . H04W 64/00; H04W 64/003; H04W 64/006; H04W 4/02; H04W 4/023; H04W 4/025
(Continued)

(56) References Cited

U.S. PATENT DOCUMENTS

| 4,128,835 A | 12/1978 | Russell |
| 4,879,711 A | 11/1989 | Rosen |

(Continued)

OTHER PUBLICATIONS

Mohorcic et al. Broadband Communications from Aerial Platform Networks. Research Paper—Y 2004 [retrieved on Apr. 20, 2015]. Retrieved from the internet: <URL: 2-10 http://www.researchgate.net/profile/Mihael_Mohorcic/publication/215650814 Broadband_Communicationsfrom_Aerial_Platform_Networks/links/09e41510815e28b01b000000.pdf> entire document.

*Primary Examiner* — Temica M Beamer
(74) *Attorney, Agent, or Firm* — Thomas D. Foster; Bruce Hare (57) ABSTRACT

An automated method of determining a location of an aerial platform is described. The method includes: transmitting, from the aerial platform, a first pilot signal; receiving, at a set of ground devices, the first pilot signal; determining a first set of values based on measurements associated with the first pilot signal; and calculating a position of the aerial platform based at least partly on the first set of values. An automated method adapted to determine a location of a ground device includes: transmitting, from the ground device, a first pilot signal; receiving, at each aerial platform in a set of aerial platforms, the first pilot signal; determining a first set of values based on measurements associated with the first pilot signal; and calculating a position of the ground device based at least partly on the first set of values. A system adapted to provide location information is described.

20 Claims, 9 Drawing Sheets (51) Int. Cl.
*G01S 5/02* (2010.01)
*G06Q 10/08* (2012.01)
*G01S 5/14* (2006.01)
*G01S 13/87* (2006.01)
*H04B 7/185* (2006.01)
*H04W 64/00* (2009.01)

(52) U.S. Cl.
CPC ..... *G06Q 10/0833* (2013.01); *H04B 7/18502* (2013.01); *H04W 64/003* (2013.01)

(58) Field of Classification Search
USPC .................. 455/456.1, 456.2, 456.3, 456.5
See application file for complete search history.

(56) References Cited

U.S. PATENT DOCUMENTS

| | | | |
|---|---|---|---|
| 5,642,122 A | 6/1997 | Lockie et al. | |
| 5,859,620 A | 1/1999 | Skinner et al. | |
| 5,974,317 A | 10/1999 | Djuknic et al. | |
| 6,167,036 A | 12/2000 | Beven | |
| 6,788,662 B2* | 9/2004 | Ozluturk | G06F 13/374 370/335 |
| 6,856,803 B1 | 2/2005 | Gross et al. | |
| 7,123,919 B1 | 10/2006 | Driessen | |
| 8,183,999 B1* | 5/2012 | Giallorenzi | G08B 21/0266 340/539.13 |
| 2002/0122412 A1 | 9/2002 | Chen et al. | |
| 2002/0126042 A1 | 9/2002 | Chang et al. | |
| 2004/0147222 A1 | 7/2004 | Walsh et al. | |
| 2004/0148067 A1 | 7/2004 | Griffith et al. | |
| 2004/0246177 A1 | 12/2004 | Lloyd et al. | |
| 2005/0035897 A1* | 2/2005 | Perl | G01S 13/878 342/29 |
| 2006/0223573 A1 | 10/2006 | Jalali | |
| 2007/0177549 A1 | 8/2007 | Lo et al. | |
| 2007/0237029 A1 | 10/2007 | Watson | |
| 2007/0241957 A1* | 10/2007 | Murphy | G01S 19/00 342/357.21 |
| 2010/0273504 A1 | 10/2010 | Bull et al. | |
| 2011/0156878 A1* | 6/2011 | Wu | G01S 5/0081 340/10.1 |
| 2013/0070677 A1* | 3/2013 | Chang | G01S 13/9303 370/328 |
| 2013/0231106 A1 | 9/2013 | Knoblach et al. | |
| 2013/0321214 A1 | 12/2013 | Zhou et al. | |
| 2014/0228049 A1* | 8/2014 | Hannan | G01S 5/0036 455/456.1 |

* cited by examiner

LOCATION BASED SERVICES PROVIDED VIA UNMANNED AERIAL VEHICLES (UAVS)

CROSS-REFERENCE TO RELATED APPLICATIONS

This application claims priority to U.S. Provisional Patent Application Ser. No. 61/940,805, filed on Feb. 17, 2014, and U.S. Provisional Patent Application Ser. No. 61/946,575, filed on Feb. 28, 2014.

BACKGROUND OF THE INVENTION

Many underdeveloped areas may not have access to broadband services such as satellite location services. Infrastructure expenses may prevent improvement in such areas.

Many aerial platforms such as airplanes and drones or Unmanned Aerial vehicles (UAVs) have been or will be deployed in various regions around the world for broadband access. Such platforms may be deployed in a more cost effective manner than typical satellite networks.

Thus, there is a need for an efficient way to determine location of and/or track elements using aerial platforms.

BRIEF SUMMARY OF THE INVENTION

Some embodiments may provide a way to determine location information using an aerial platform network. Such location information may include the position of system elements such as aerial platforms, user devices, tracking devices, vehicles, etc.

In some embodiments, times of arrival (TOAs) or round trip delays (RTDs) of signals transmitted from a set of devices to an aerial platform may be used to triangulate a location of the aerial platform.

In some embodiments, TOAs or RTDs of signals transmitted from a set of aerial platforms to a device may be used to triangulate a location of the device.

A first exemplary embodiment provides an automated method adapted to determine a location of an aerial platform. The method includes: transmitting, from the aerial platform, a first pilot signal; receiving, at a set of ground devices, the first pilot signal; determining a first set of values based on measurements associated with the first pilot signal; and calculating a position of the aerial platform based at least partly on the first set of values.

A second exemplary embodiment provides an automated method adapted to determine a location of a ground device. The method includes: transmitting, from the ground device, a first pilot signal; receiving, at each aerial platform in a set of aerial platforms, the first pilot signal; determining a first set of values based on measurements associated with the first pilot signal; and calculating a position of the ground device based at least partly on the first set of values.

A third exemplary embodiment provides a system adapted to provide location information. The system includes: a set of aerial platforms, each aerial platform comprising a radio sub-system adapted to transmit and receive signals; a set of ground devices, each ground device comprising a radio sub-system adapted to transmit and receive signals; a location server adapted to store location information and calculate locations based at least partly on data associated with at least one aerial platform and at least one ground device.

The preceding Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features. Broadly, some embodiments of the present invention generally provide a way to determine and/or track location using a network of aerial platforms.

Such aerial platforms may include, for instance, drones, UAVs, balloons, blimps, airships, etc. Each platform may include propulsion elements, fuel systems, navigational elements, control systems, etc. In some embodiments, a drone may include a fixed wing fuselage in combination with a propeller and/or other appropriate elements. In some embodiments, a UAV may be a robo-copter or similar device. Each UAV may carry fuel and/or use solar energy (or other alternatives). Throughout this disclosure, the terms "aerial platform" and "drone" may be used to refer to any aerial platform including those described above and other appropriate aerial platforms.

Figure 1A:
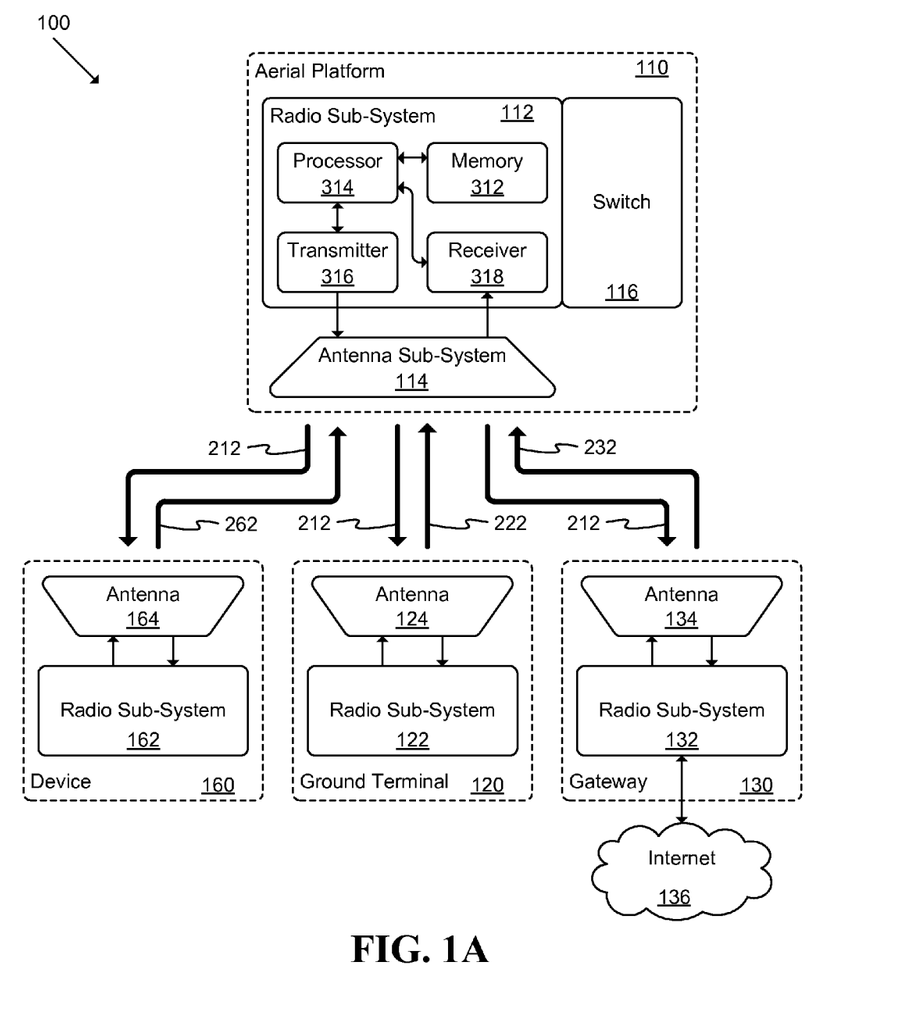
FIG. 1A illustrates a schematic block diagram of an aerial platform based communications system of some embodiments.

FIG. 1A illustrates a schematic block diagram of an aerial platform based communications system 100 of some embodiments. As shown, the system may include at least one aerial platform or drone 110, device 160, ground terminal 120, and/or gateway 130.

Each aerial platform 110 may include a radio sub-system 112, a message switch sub-system 116, and at least one antenna aperture sub-system 114.

As shown, the radio sub-system 112 may include multiple sub-systems. Receiver 318 may be adapted to demodulate and decode signals received from antenna sub-system 114. Transmitter sub-system 316 may be adapted to modulate the data received from processor 314 and send the resulting signal through antenna sub-system 114. Processor sub-system 314 may be adapted to carry out functions such as configuring the receiver 318 and transmitter 316 sub-systems, processing the data received from the receiver 318 sub-system, determining the data to be transmitted through the transmitter sub-system 316, and/or controlling the antenna sub-system 114. Memory sub-system 312 may be adapted to store data such as, for instance, program code, configuration data, and system parameter information used to control the operations of processor 314.

Depending on the altitude of the drone 110, each drone may be associated with an area on the ground having a particular radius (e.g., ranging from tens of kilometers to two hundred kilometers or more).

Each drone may communicate with various types of ground terminals. Example system 100 includes a ground terminal (GT) 120, a gateway (GTW) 130, and devices 160.

A GT 120 may be a terminal that is able to provide Internet connectivity to a home or enterprise via one or more aerial platforms 110. The GTW 130 may be a network connected device that is able to provide access to the Internet.

Devices 160 may be user devices such as computers, tablets, mobile phones, etc. In addition, in some embodiments, the devices may include "tags" that may be associated with assets such as vehicles (e.g., automobiles, trucks, airplanes, trains, ships, etc.), merchandise (e.g., individual items, shipping containers, etc.), and/or other appropriate items. Thus, device 160 and/or the terms "device" (or "ground device") may refer to fixed or moving devices, devices located inside buildings, devices associated with users and/or platforms such as vehicles, etc. In addition, the term "ground device" may also refer to ground terminals (e.g., GT 120, GTW 130, etc.).

Each GT 120 may transmit and receive data from Internet-connected resources using the drone 110 as an intermediary. The radio sub-system 112 may aggregate traffic received from multiple GTs 120 and send the aggregated data to a set of Internet resources via one or more GTWs 130. Therefore, the GTWs need to provide much higher data rates with respect to drones 110 than the GTs 120 do. Thus the gain of a GTW 130 antenna sub-system must be larger than that of the GT 120 antenna sub-system, and a GTW 130 transmitter must transmit at higher power than the GT 120 transmitter.

The term "GT" may be used throughout the specification to refer to both GTs 120 and GTWs 130 when describing elements or features that apply to both GTs 120 and GTWs 130.

Each GT 120 may include two main sub-systems: a radio sub-system 122, and an antenna sub-system 124. The radio sub-system 122 may include sub-elements similar to those described above in reference to radio sub-system 112.

Each GT 130 may include two main sub-systems: a radio sub-system 132, and an antenna sub-system 134. The radio sub-system 132 may include sub-elements similar to those described above in reference to radio sub-system 112 or radio system 122.

Each device 160 may include two main sub-systems: a radio sub-system 162 and an antenna sub-system 164. The radio sub-system 162 may include sub-elements similar to those described above in reference to radio sub-system 112, radio system 122, or radio system 132. However, requirements of the sub-systems for the GTs 120 and 130 and devices 160 may differ. For instance, the radio frequency band used by devices 160 may include lower frequencies such as those used by cellular bands or unlicensed bands such as those used by Wi-Fi devices. In contrast, GTs 120 and 130 may use higher frequency bands (e.g., from ten to forty GHz).

Figure 1B:
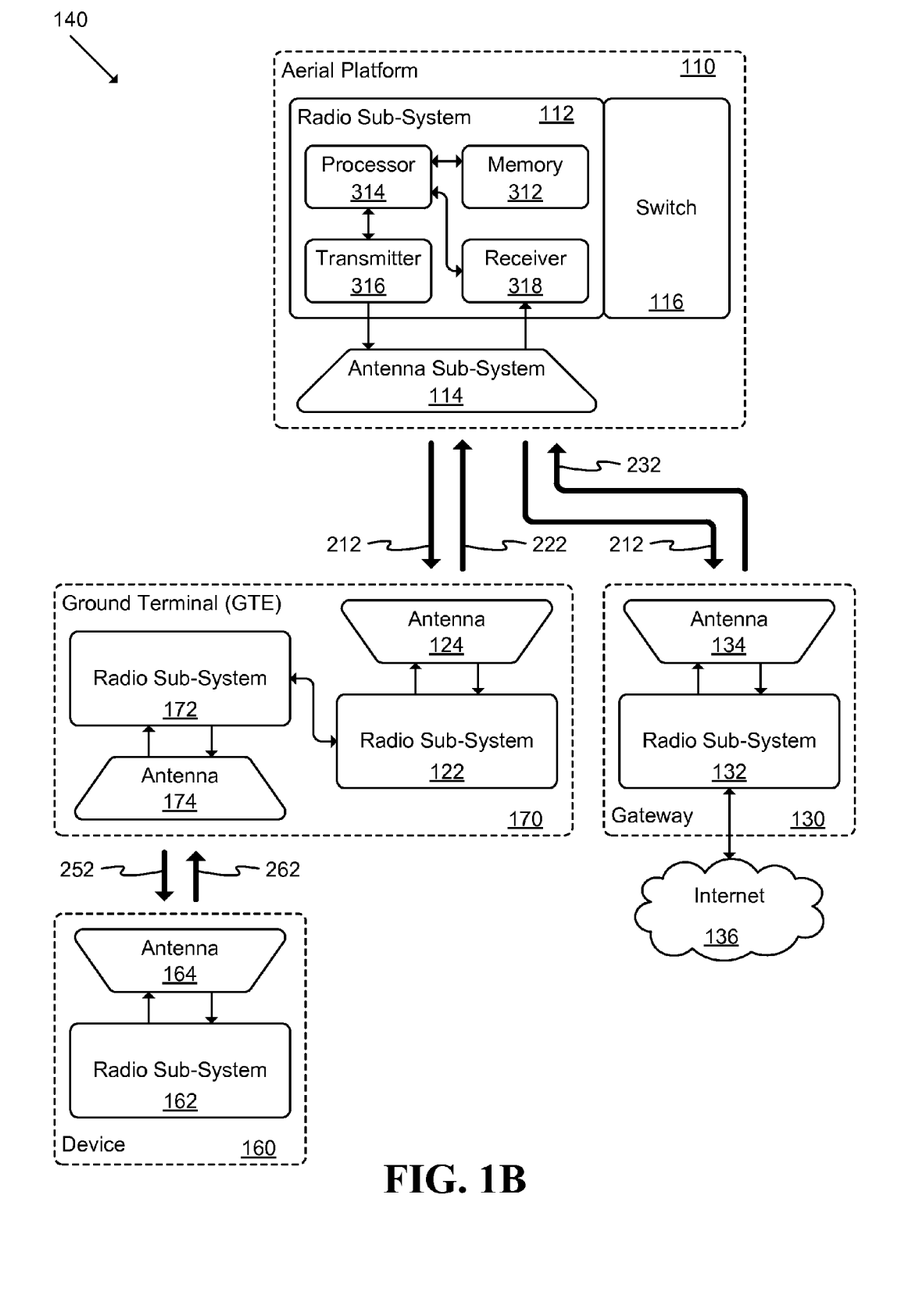
FIG. 1B illustrates a schematic block diagram of an alternative aerial platform based communications system of some embodiments.

FIG. 1B illustrates a schematic block diagram of an alternative aerial platform based communications system 140 of some embodiments. This example system includes an extended ground terminal (GTE) 170. The GTE may be an extension of GT 120 that is able to provide a communications link between the GTE 170 and devices 160. Thus, GTEs 170 are able to communicate with aerial platforms 110 as well as with devices 160. In this configuration, devices 160 may communicate directly with a drone 110 (as in system 100) or via the GTE 170.

As shown, terminal 170 may include two radio sub-systems 122 and 172, and two antenna sub-systems 124 and 174. The radio sub-system 172 may include sub-elements similar to those described above in reference to radio sub-system 112, radio system 122, radio system 132, or radio system 162. However, requirements of the sub-systems for the GTE 170 and devices 160 (or other elements) may differ. For instance, antenna sub-system 164 may need to be smaller than antenna sub-system 174 because devices 160 may be included in small fixtures such as asset tags or phones and thus may have smaller antennae due to size limitations.

Some embodiments may utilize a network of aerial platforms 110 to monitor devices 160 even within environments having high propagation losses such as indoor locations associated with large building penetration loss. Devices inside buildings or other poor propagation locations may communicate with the aerial platform 110 using multiple approaches. As shown in FIG. 1B, each device 160 may first communicate with GTE 170 via the antenna 174 and radio sub-system 172, and terminal 170 may relay the information to the aerial platform 110 via the antenna 124 and radio sub-system 122.

Alternatively, as shown in FIG. 1A, device 160 may directly communicate with the aerial platform 110. Devices 160 which directly communicate with the aerial platform 110 may be referred to as "direct devices" throughout this disclosure. Direct devices may operate in applications and environments where there is no terminal 170 in their vicinity to act as an intermediary. For instance, a device 160 may be inside a building which has no broadband connectivity to a drone network. As another example, device 160 may be outside but too far away to communicate with terminal 170 in which case the device may directly communicate with the aerial platform 110 as an alternative path.

During operation of system 100, the radio sub-system 162 may search for pilot/beacon signals sent in messages 212 from each aerial platform 110. The pilot/beacon signals may incur different propagation losses to different devices 160 depending on obstructions between the aerial platform 110 and the device 160. In some embodiments, in order for the aerial platform pilot/beacon signal to reach the device with the largest path loss, such as devices inside buildings, the aerial platform transmitter may transmit the pilot/beacon signal at very high power so that enough energy is received at radio sub-system 162 to detect the signal 212. Alternatively, in some embodiments radio sub-system 112 may transmit the signal for a long enough time duration that the device receiver may integrate the signal to accumulate enough energy to detect the pilot/beacon 212.

However, it may be inefficient if the drone pilot signal is always transmitted at very high power or for long time duration. In some embodiments, in order to improve the efficiency of the system, the drone pilot signals may be transmitted at high power based on some criteria (e.g., time interval since last high power transmission, a location of an obstructed device, etc.). In some embodiments, the pilot/beacon signal may be transmitted for longer time duration based on some criteria (e.g., time interval since last longer duration transmission, awareness of an obstructed device, etc.). The higher power and/or longer duration pilot/beacon signal may be referred to as a "deep ranging" pilot/beacon signal throughout this disclosure.

In conjunction with the deep ranging pilot, certain messages (e.g., paging messages) may be sent at a low data rate following a deep ranging pilot transmission. The low data rate messaging may be referred to as "deep paging". Deep paging may allow the aerial platform network to reach direct devices 160 inside buildings or in poor coverage areas such as under heavy vegetation. Deep paging may inform a device 160 that the network intends to communicate with the device. In locations with poor coverage where deep paging is needed, the device and aerial platform may still communicate but at low data rates. Following reception of a deep paging message, the device 160 may send a response/message to the aerial platform 110 at a low data rate that is detectable by the aerial platform under poor propagation conditions where deep paging is needed. The data rate at which the device may transmit following reception of the deep paging channel may be pre-determined and sent to the devices 160 using a system parameter message. Alternatively, upon receiving the deep paging message, a user associated with the device 160 may decide to move into a location with less path loss, such as outside a building or in a place with fewer obstructions, to be able to receive data at higher rates.

The devices 160 may be capable of searching for pilot signals by integrating the received signal over varying time intervals. When a device has a line of sight (LOS) communication path with respect to an aerial platform 110, the device may attempt to detect the "nominal" pilot signal with a power and duration configured for environments allowing unobstructed communication. If the pilot signal is not detected using a nominal integration time, the device radio receiver may search for a deep ranging pilot signal using a longer duration or higher power until a pilot is detected.

Figure 2:
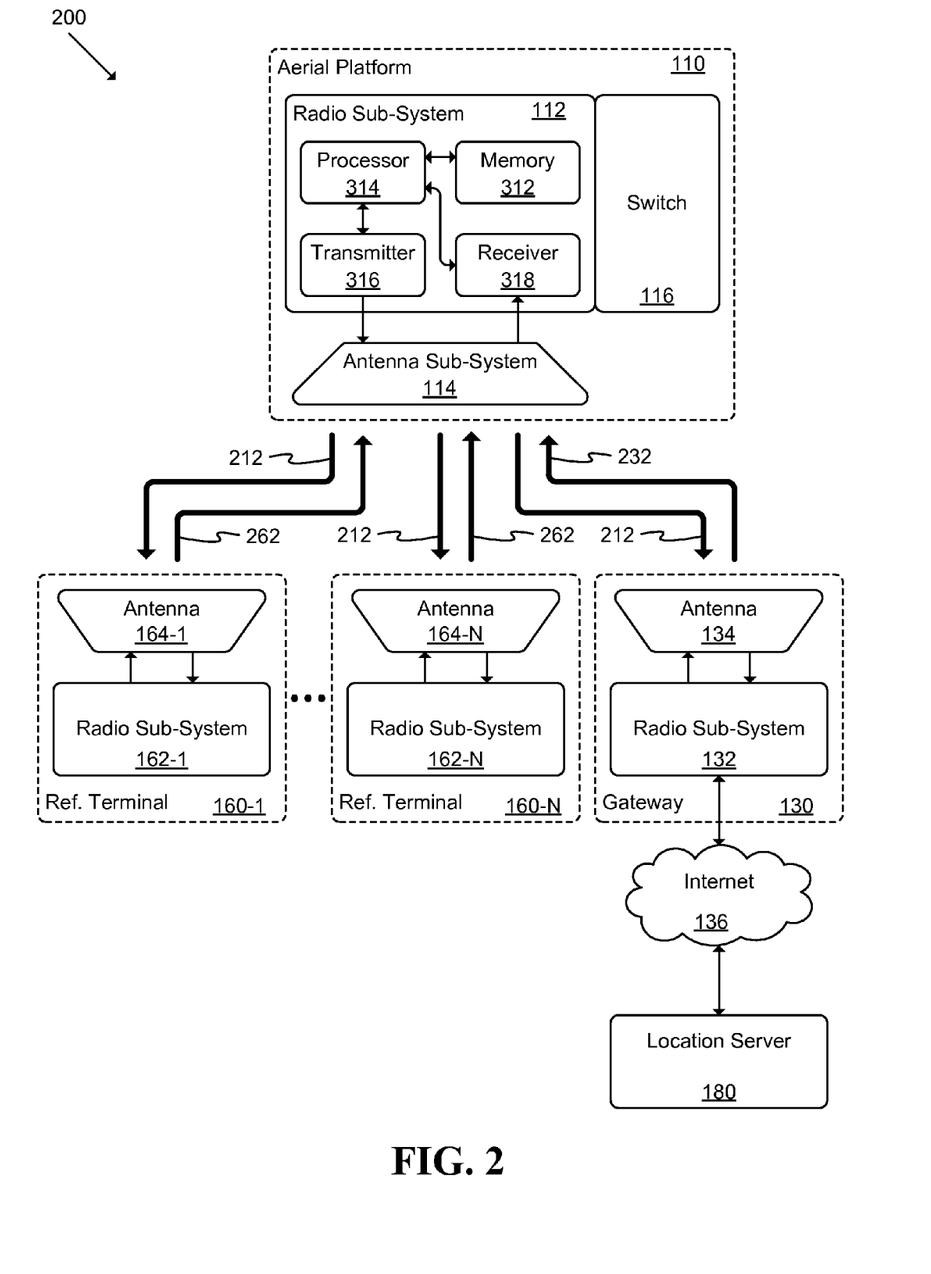
FIG. 2 illustrates a schematic block diagram of an aerial platform system of some embodiments that is able to ascertain a location of an aerial platform.

FIG. 2 illustrates a schematic block diagram of an aerial platform system 200 of some embodiments that is able to ascertain a location of an aerial platform. In this example, multiple reference terminals 160-1-160-N may be able to communicate with the drone 110. The location of each reference ground terminal may be known by the location server 180.

In order to estimate the position of the aerial platform 110, time of arrival measurements from the aerial platform 110 to ground terminals 160-1-160-N may be used. Some embodiments use a location algorithm based on triangulation of TOA measurements received at terminals 160-1-160-N from the aerial platform 110. The aerial platform may transmit a beacon signal 212 that is received by terminals 160-1-160-N. The timing clock of the different ground terminal radio sub-systems 162-1-162-N may be synchronized using an appropriate synchronization scheme. The radio sub-systems of the ground terminals 160-1-160-N that receive the beacon signal 212 from the aerial platform 110 may send the measured TOA values to gateway 130 which, in turn, may forward the TOA measurement to a location server 180. The location or position server 180 may carry out an appropriate triangulation analysis based on the measured TOAs of the different terminals in order to estimate the position of the aerial platform 110.

In some embodiments, the aerial platform 110 may make RTD measurements using each of a number of ground terminals 160-1-160-N. Such RTD measurements may begin when the aerial platform 110 sends a message 212 to a given ground terminal 160-j. The ground terminal 160-j may measure TOA of the message 212 and, in turn, send a message 262 to the aerial platform 110. The aerial platform may measure the TOA of message 262. Due to processing and scheduling delays it takes some time between when ground terminal 160-j receives message 212 and the time it sends message 262, message 262 may carry the time between reception of message 212 and transmission of message 262 so that aerial platform 110 may compute the RTD while excluding any delay not related to the propagation delay.

The RTD scheme does not require that the ground terminals 160-1-160-N have synchronized clocks. The RTD measurement may also begin when a ground terminal 160-j sends a message 262 to the aerial platform 110 and the aerial platform responds with a message 212. The aerial platform 110 may compute its position in some embodiments using the measured RTD values from ground terminals 160-1-160-N and known locations of the ground terminals, or may send the measured RTD values to location server 180 for computation of the device position.

Once the position of an aerial platform 110 is determined, the position may be reported to terminals and/or devices in the coverage area of the aerial platform so that the system may use the position of the aerial platforms to determine the location of terminals and/or devices as described in reference to FIGS. 3-7 below.

Because the aerial platforms move with time, the location of the aerial platforms must be periodically updated. In some embodiments, the radio sub-system 112 may be equipped with a gyroscope and/or accelerometer sub-system that can be used to update the location of the aerial platform after an initial location is determined using the systems of some embodiments. The gyroscope and/or accelerometer of the radio sub-system may sense directional changes (in three dimensions) of the aerial platform 110 and send the sensed changes to the processor sub-system 318. The processor sub-system may use the information to estimate incremental changes in the position of the aerial platform 110. The processor sub-system 318 may update the position coordinates of the aerial platform using the incremental direction changes estimated from the gyroscope/accelerometer information and the last location estimate of the aerial platform. The radio sub-system 112 may send the updated location estimate of the aerial platform 110 to the ground terminals 120,130, and 170 and/or devices 160.

Figure 3:
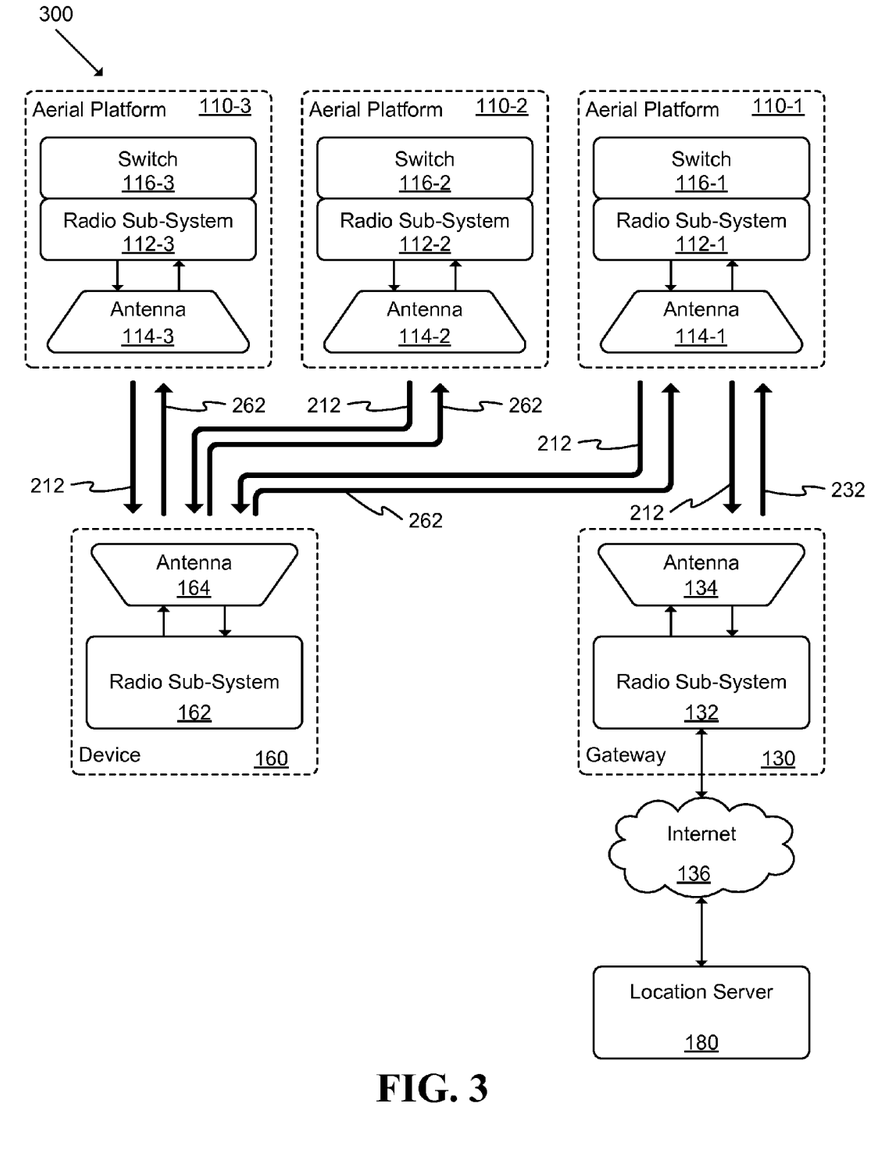
FIG. 3 illustrates a schematic block diagram of an aerial platform system of some embodiments that is able to ascertain a location of a ground terminal.

FIG. 3 illustrates a schematic block diagram of an aerial platform system 300 of some embodiments that is able to ascertain a location of a ground terminal or device 160.

In order to estimate a position of direct device 160, TOA measurements from the device to multiple aerial platforms 110-1-110-3 may be used to triangulate a location of the direct device 160. The device may transmit a beacon signal 262 that is able to be received by multiple aerial platforms 110-1-110-3. The timing clock of the different aerial platform radio sub-systems 112-1-112-3 must be synchronized using an appropriate scheme.

The radio sub-systems that receive the beacon signal 262 may send measured TOA values to the location server 180. The server may carry out the appropriate triangulation analysis on the measured TOAs to estimate the position of the device 160. The device may also estimate TOA of reference signals received from multiple aerial platforms 110-1-110-3 and carry out triangulation using the measured TOA values and known positions of the aerial platforms 110-1-110-3. The location mechanisms described above for devices 160 may also be used to determine locations of other types of devices such as ground terminals 120, 130, or 170, as well as any devices 160 associated with vehicles, goods, etc.

In some embodiments, the device 160 position may be determined using RTD measurements associated with each of a number of aerial platforms 110. The RTD measurements may begin when device 160 sends a message 262 to a given aerial platform 110-1. The aerial platform 110-1 may measure TOA of the message 262 and, in turn, send a message 212 to device 160. The device may measure the TOA of message 212. Due to processing and scheduling there is a delay between the time aerial platform 110-1 receives message 262 and the time the aerial platform 110-1 sends message 212. Message 212 may include the time between reception of message 262 and transmission of message 212 such that device 160 may compute the RTD while excluding any delay not related to the propagation delay. Such an RTD scheme does not require clock synchronization among different aerial platforms. The RTD measurement may also begin when the aerial platform 110-1 sends a message 212 to the device 160 and the device responds with a message 262. The device 160 may compute the device position using the measured RTD values, or may send the measured RTD values to location server 180 (or another external resource) to compute the device position.

Figure 4:
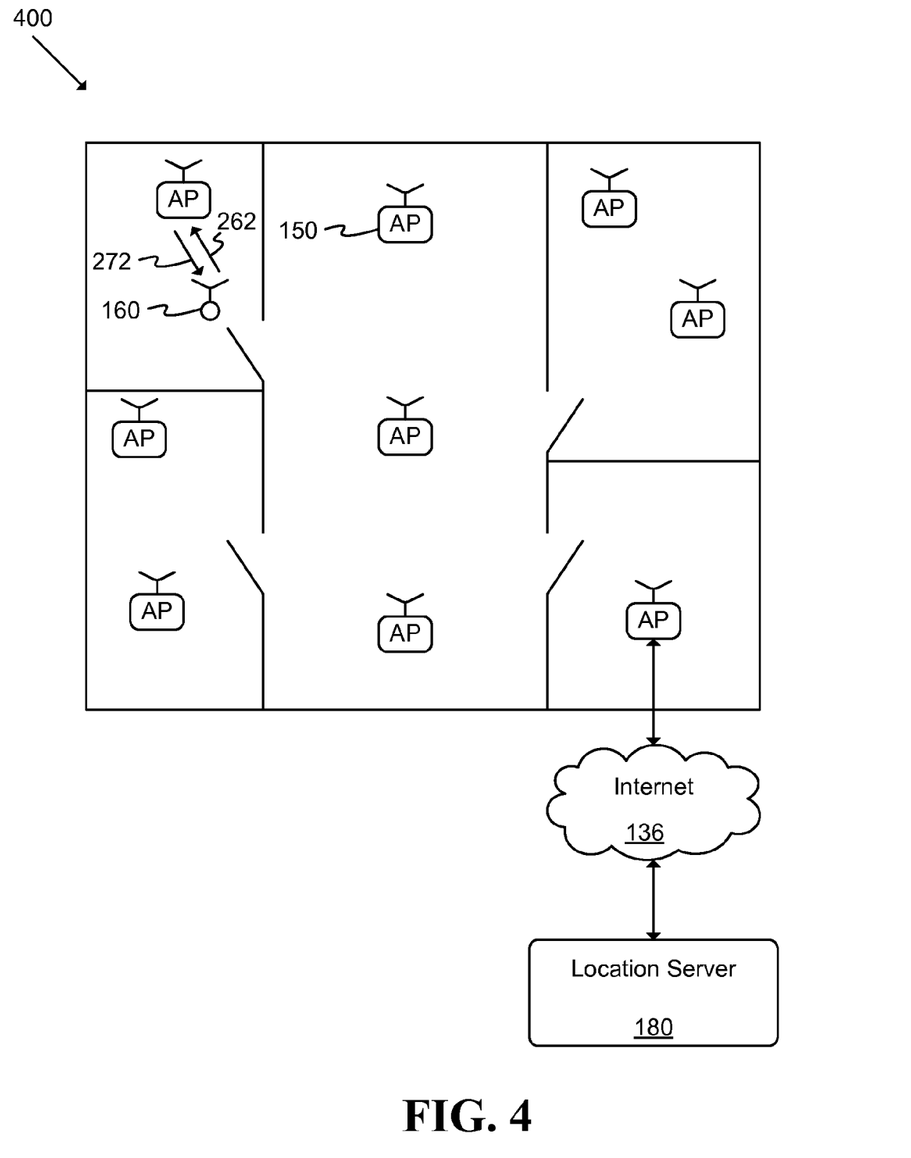
FIG. 4 illustrates a schematic block diagram of a system of some embodiments used to ascertain a location of a connected device.

FIG. 4 illustrates a schematic block diagram of a system 400 of some embodiments used to ascertain a location of a connected device 160.

In some embodiments, the antenna 174 and radio subsystems 172 of terminal 170 may be configured to serve as an access point (AP) 150 capable of communicating with devices 160. Such APs 150 may be deployed in multiple locations inside a building, home, or other appropriate structure to communicate with and locate devices 160. The location of device 160 in this example may be computed using the RTD or TOA schemes described above. Devices 160 may use the same protocols described above for making TOA and/or RTD measurements with aerial platforms 110 but using APs 150 via messages 262 and 272.

One of ordinary skill in the art will recognize that systems 100-400 (and/or sub-elements thereof) may be implemented in various different ways without departing from the spirit of the invention. For instance, different embodiments may include different arrangements of elements, include additional elements, and/or omit elements. In addition, the systems and devices described above are conceptual in nature with various necessary elements omitted for clarity (e.g., power sources, physical connectors, etc.).

Figure 5:
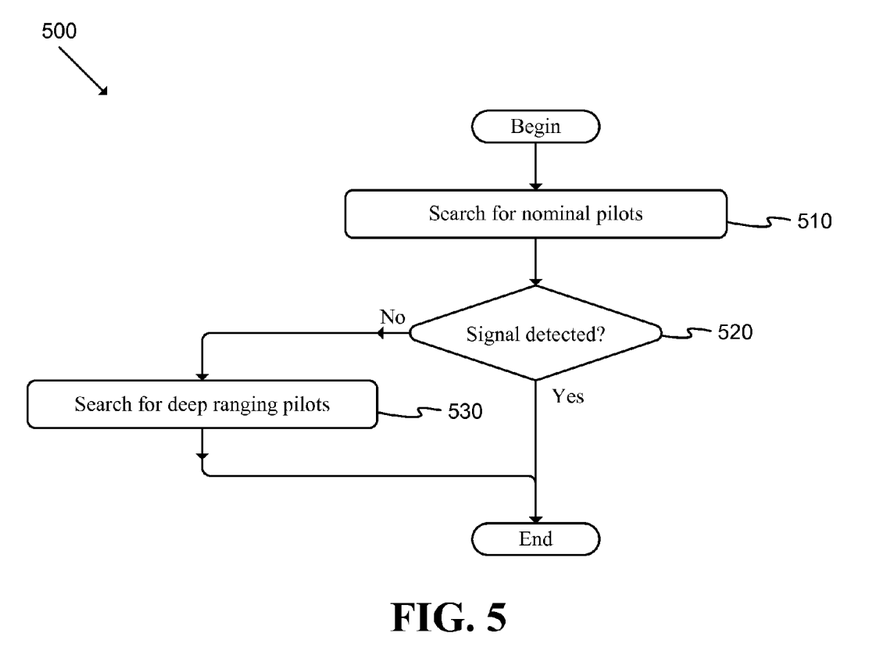
FIG. 5 illustrates a flow chart of a conceptual process used by some embodiments to evaluate beacon signals from aerial platforms.

FIG. 5 illustrates a flow chart of a conceptual process 500 used by some embodiments to evaluate beacon signals from aerial platforms. The process may begin when an aerial platform transmits a pilot signal. As described above, such a signal may be transmitted at nominal power and nominal time duration, referred to as "nominal pilot" signals, as well as deep ranging pilots.

Next, the process may search (at 510) for nominal pilot signals. Such a search may be performed by a device radio sub-system of some embodiments. The process may then determine (at 520) whether a nominal signal was detected. If the process determines (at 520) that a nominal signal has been detected, the process may end.

If the process determines (at 520) that no nominal pilot has been detected, the process may then search (at 530) for deep ranging pilot signals. Such a search may be performed by a device radio sub-system of some embodiments.

Process 500 (or portions thereof) may be repeated at regular intervals, repeated based on various criteria, and/or performed iteratively. In addition, in some embodiments, the power or duration of the signal may be progressively increased until the signal is able to be detected by an appropriate device.

Some embodiments provide systems and methods to determine the position of an aerial platform. Aerial platforms such as drones or UAVs may change position over time. If the position of the aerial platform is needed by ground terminals or devices, the position of the aerial platform must be updated and sent to the terminals and/or devices (or provided to a server or other appropriate system element).

In some cases, the aerial platform may be equipped with a global positioning system (GPS) receiver, and the position of the aerial platform may be updated based on periodic position updates from the GPS receiver. The aerial platform position may then be transmitted using a system parameter message to all terminals and devices. Alternatively, the aerial platform position may be determined and/or updated by measuring TOA, at the aerial platform, of signals received from multiple ground terminals, and by triangulating the measured time of arrival measurements as described above.

Figure 6:
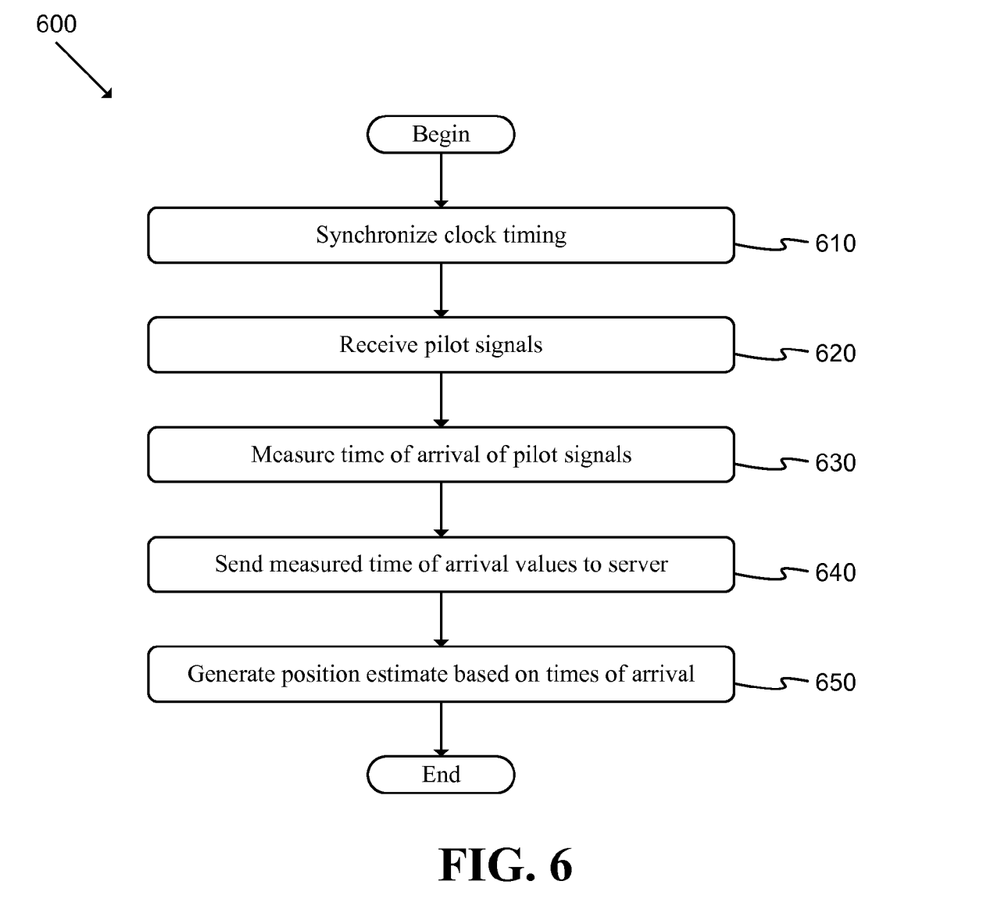
FIG. 6 illustrates a flow chart of a conceptual process used by some embodiments to determine a location of a direct device using times of arrival at a set of aerial platforms.

FIG. 6 illustrates a flow chart of a conceptual process 600 used by some embodiments to determine a location of a direct device using times of arrival at a set of aerial platforms. Such a process may begin, for instance, when a user makes a request, when an application running on the direct devices requests position information, etc.

Next, the process may synchronize (at 610) clock timing of the aerial platforms. The process may then receive (at 620) pilot signals transmitted by the device radio subsystems of some embodiments.

Process 600 may then measure (at 630) TOAs of the pilot signal received from the devices. Next, the process may send (at 640) the measured TOA values to a location sever (or other appropriate element). The process may then generate (at 650) a position estimate based on the measured TOAs and then end. Alternatively, in some embodiments, an aerial platform may determine a position based on the TOAs without sending the values to a server (or other external element).

Figure 7:
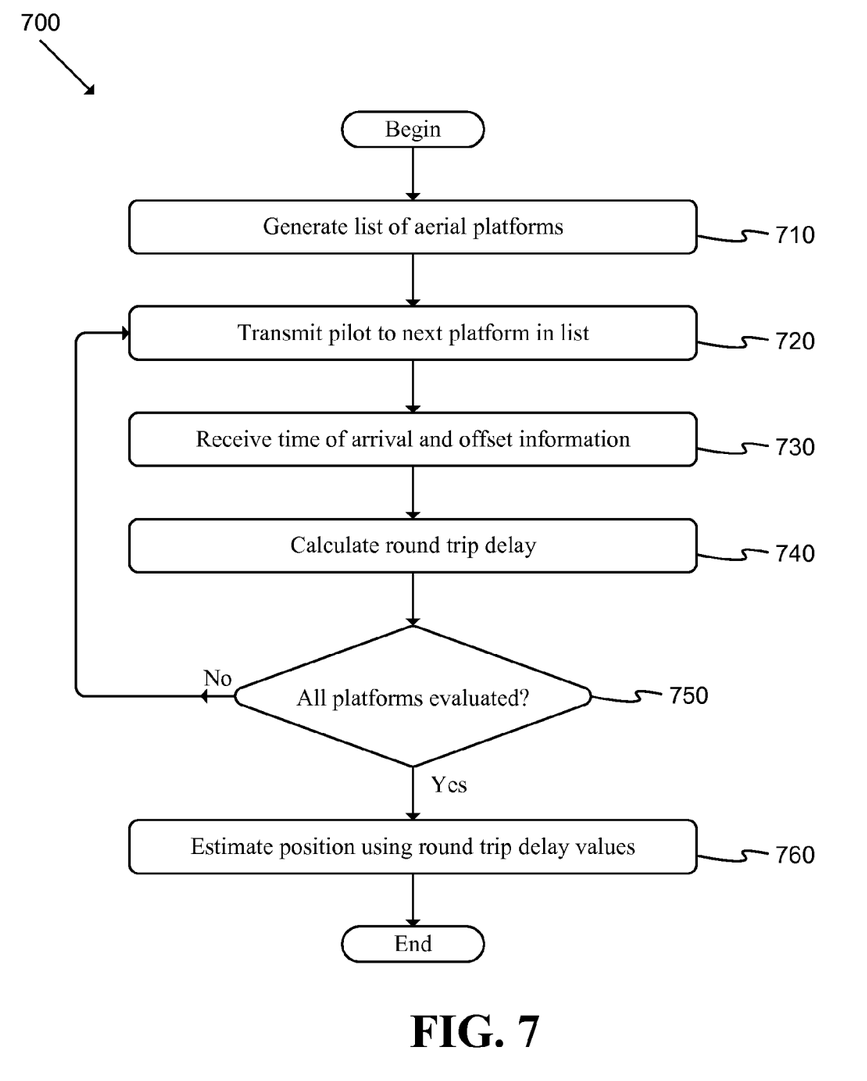
FIG. 7 illustrates a flow chart of a conceptual process used by some embodiments to determine a location of a direct device using round trip delay to a set of aerial platforms.

FIG. 7 illustrates a flow chart of a conceptual process 700 used by some embodiments to determine a location of a direct device using RTD to a set of aerial platforms. The process may begin, for instance, when a user requests a location update. Such a process may be performed by a device of some embodiments.

As shown, the process may generate (at 710) a list of aerial platforms with which the device will make RTD measurements. Next, the process may transmit (at 720), from the device, a pilot signal or message to the next aerial platform in the list. The aerial platform may measure the TOA of the received message or signal. Next, the process may receive (at 730) the TOA, message processing delay, and transmission offset delay within a message sent by the aerial platform.

The process may then calculate (at 740) RTD based on the message received from the aerial platform. Next, the process may determine (at 750) whether all platforms in the list have been evaluated. If the process determines (at 750) that all platforms have not been evaluated, the process may perform operations 720-750 until the process determines (at 750) that all platforms in the list have been evaluated.

If the process determines (at 750) that all platforms in the list have been evaluated, the process may then estimate (at 760) device position using the RTD values and then may end.

One of ordinary skill in the art will recognize that processes 500-700 may be performed in various different ways without departing from the spirit of the invention. For instance, different embodiments may perform the operations in different orders, may include additional operations, and/or may omit various operations. In addition, each process may be divided into a set of sub-processes and/or performed as part of a larger macro process. Various processes (or portions thereof) may be performed iteratively, at regular intervals, and/or based on some criteria.

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), Application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 8:
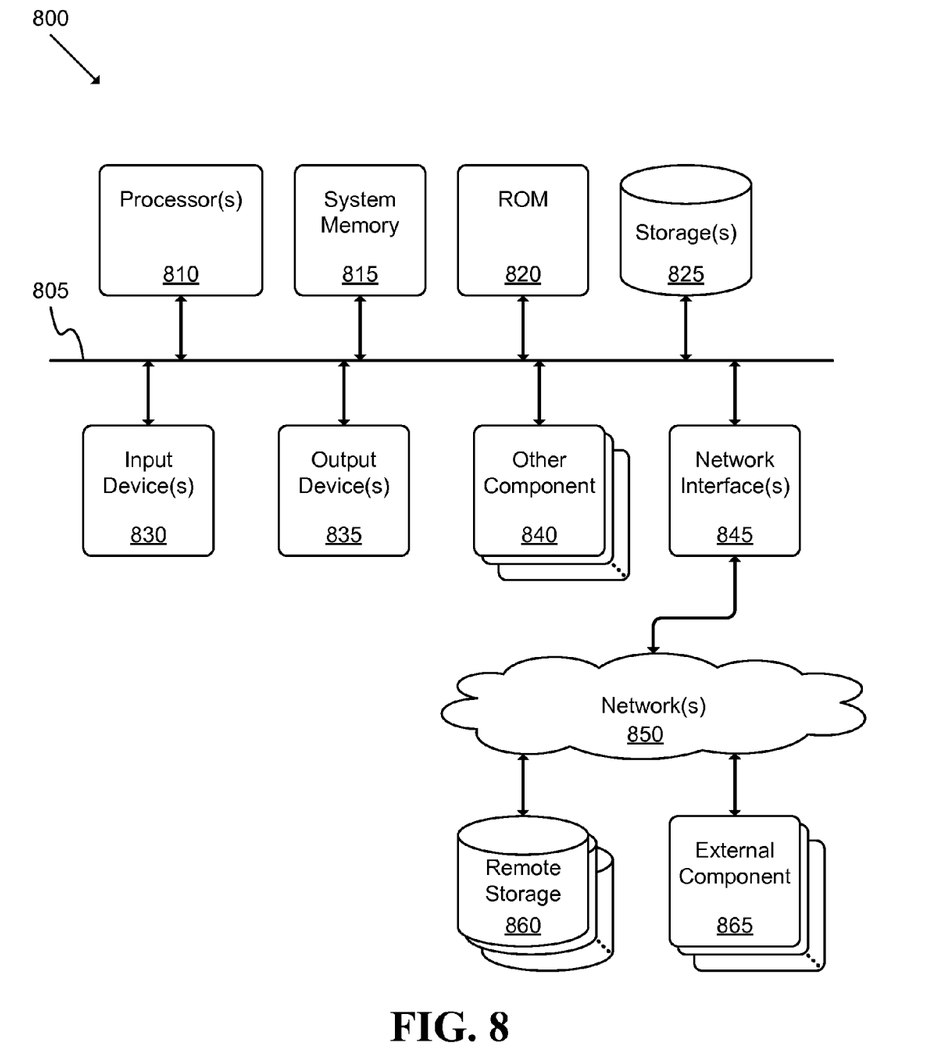
FIG. 8 illustrates a schematic block diagram of a conceptual computer system used to implement some embodiments of the invention.

FIG. 8 illustrates a schematic block diagram of a conceptual computer system 800 used to implement some embodiments of the invention. For example, the systems described above in reference to FIGS. 1-4 may be at least partially implemented using computer system 800. As another example, the processes described in reference to FIGS. 5-7 may be at least partially implemented using sets of instructions that are executed using computer system 800.

Computer system 800 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 800 may include at least one communication bus 805, one or more processors 810, a system memory 815, a read-only memory (ROM) 820, permanent storage devices 825, input devices 830, output devices 835, various other components 840 (e.g., a graphics processing unit), and one or more network interfaces 845.

Bus 805 represents all communication pathways among the elements of computer system 800. Such pathways may include wired, wireless, optical, and/or other appropriate communication pathways. For example, input devices 830 and/or output devices 835 may be coupled to the system 800 using a wireless connection protocol or system.

The processor 810 may, in order to execute the processes of some embodiments, retrieve instructions to execute and/or data to process from components such as system memory 815, ROM 820, and permanent storage device 825. Such instructions and data may be passed over bus 805.

System memory 815 may be a volatile read-and-write memory, such as a random access memory (RAM). The system memory may store some of the instructions and data that the processor uses at runtime. The sets of instructions and/or data used to implement some embodiments may be stored in the system memory 815, the permanent storage device 825, and/or the read-only memory 820. ROM 820 may store static data and instructions that may be used by processor 810 and/or other elements of the computer system.

Permanent storage device 825 may be a read-and-write memory device. The permanent storage device may be a non-volatile memory unit that stores instructions and data even when computer system 800 is off or unpowered. Computer system 800 may use a removable storage device and/or a remote storage device as the permanent storage device.

Input devices 830 may enable a user to communicate information to the computer system and/or manipulate various operations of the system. The input devices may include keyboards, cursor control devices, audio input devices and/or video input devices. Output devices 835 may include printers, displays, and/or audio devices. Some or all of the input and/or output devices may be wirelessly or optically connected to the computer system.

Other components 840 may perform various other functions. These functions may include performing specific functions (e.g., graphics processing, sound processing, etc.), providing storage, interfacing with external systems or components, etc.

Finally, as shown in FIG. 8, computer system 800 may be coupled to one or more networks 850 through one or more network interfaces 845. For example, computer system 800 may be coupled to a web server on the Internet such that a web browser executing on computer system 800 may interact with the web server as a user interacts with an interface that operates in the web browser. Computer system 800 may be able to access one or more remote storages 860 and one or more external components 865 through the network interface 845 and network 850. The network interface(s) 845 may include one or more application programming interfaces (APIs) that may allow the computer system 800 to access remote systems and/or storages and also may allow remote systems and/or storages to access computer system 800 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 800 may be used in conjunction with the invention. Moreover, one of ordinary skill in the art will appreciate that many other system configurations may also be used in conjunction with the invention or components of the invention.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments of the invention and modifications may be made without departing from the spirit and scope of the invention as defined by the following claims.

I claim:

1. An automated method adapted to determine a location of an aerial platform, the method comprising:
   transmitting, from the aerial platform, a first pilot signal;
   receiving, at a set of ground devices, the first pilot signal;
   determining a first set of values based on measurements associated with the first pilot signal; and
   calculating a position of the aerial platform based at least partly on the first set of values, wherein:
   each ground device in the set of ground devices is associated with a known position,
   the first set of values comprises a set of time of arrival (TOA) values, each TOA value associated with a particular ground device from the set of ground devices, and
   calculating the position of the aerial platform comprises triangulating distances derived from the TOA values.

2. The automated method of claim 1, wherein each ground device includes a radio sub-system having a clock and each clock associated with a ground device from the set of ground devices is synchronized.

3. The automated method of claim 1 further comprising:
   sending, from each ground device, a message comprising at least one value from the first set of values, a processing delay, and a transmission scheduling delay;
   determining a second set of values based on the message; and
   calculating a position of the aerial platform based at least partly on the second set of values.

4. The automated method of claim 3, wherein:
   each ground device in the set of ground devices is associated with a known position,
   each TOA value is associated with a particular ground device from the set of ground devices,
   the second set of values comprises round trip delay (RTD) values, each RTD value associated with a particular ground device from the set of ground devices, and
   calculating the position of the aerial platform comprises triangulating the RTD values.

5. The automated method of claim 1 further comprising:
   transmitting, from each ground device in the set of ground devices, a second pilot signal;
   receiving, at the aerial platform, the second pilot signal;
   calculating, based at least partly on the second pilot signal, a time of arrival (TOA) value for each ground device in the set of ground devices;
   sending, from the aerial platform to each ground device in the set of ground devices, a message comprising the calculated TOA value, a processing delay, and a transmission scheduling delay.

6. The automated method of claim 5, wherein:
   each ground device in the set of ground devices is associated with a known position,
   each ground device calculates a round trip delay (RTD) value based at least partly on the message,
   calculating the position of the aerial platform comprises triangulating the RTD values.

7. An automated method that determines a location of a ground device, the method comprising:
   transmitting, from the ground device, a first pilot signal;
   receiving, at each aerial platform in a set of aerial platforms, the first pilot signal, wherein each aerial platform in the set of aerial platforms operates at an altitude that is less than fifty miles, and each aerial platform includes a propulsion element;
   determining a first set of values based on measurements associated with the first pilot signal, wherein the first set of values comprises a set of time of arrival (TOA) values; and
   calculating a position of the ground device based at least partly on the first set of values by triangulating distances derived from the TOA values.

8. The automated method of claim 7, wherein each aerial platform includes a radio sub-system having a clock and each clock associated with an aerial platform from the set of aerial platforms is synchronized.

9. The automated method of claim 8, wherein:
   each aerial platform in the set of aerial platforms is associated with a known position,
   each TOA value is associated with a particular aerial platform from the set of aerial platforms.

10. The automated method of claim 7 further comprising:
    sending, from each aerial platform, a message comprising at least one value from the first set of values, a processing delay, and a transmission scheduling delay;
    determining a second set of values based on the message; and
    calculating a position of the ground device based at least partly on the second set of values.

11. The automated method of claim 10, wherein:
    each aerial platform in the set of aerial platforms is associated with a known position,
    each TOA value is associated with a particular aerial platform from the set of aerial platforms
    the second set of values comprises round trip delay (RTD) values, each RTD value associated with a particular aerial platform from the set of aerial platforms, and
    calculating the position of the ground device comprises triangulating the RTD values.

12. The automated method of claim 7 further comprising:
    transmitting, from each aerial platform in the set of aerial platforms, a second pilot signal;
    receiving, at the ground device, the second pilot signal;
    calculating, based at least partly on the second pilot signal, a time of arrival (TOA) value for each aerial platform in the set of aerial platforms; and
    sending, from the ground device to each aerial platform in the set of aerial platforms, a message comprising the calculated TOA value, a processing delay, and a transmission scheduling delay, wherein:
    each aerial platform in the set of aerial platform is associated with a known position,
    each aerial platform calculates a round trip delay (RTD) value based at least partly on the message,
    calculating the position of the ground device comprises triangulating the RTD values.

13. The automated method of claim 12, wherein the known position of each aerial platform in the set of aerial platforms is determined at least partly using a sub-system of the aerial platform, the sub-system comprising at least one of a set of gyroscopes and a set of accelerometers and three-dimensional direction changes measured by the sub-system are used to update the known position.

14. A system that provides location information, the system comprising:
  a set of aerial platforms, each aerial platform comprising a radio sub-system that transmits and receives signals;
  a set of ground devices, each ground device comprising a radio sub-system that transmits and receives signals;
  at least one gateway that provides, to the set of aerial platforms and the set of ground devices, access to a distributed network comprising the Internet; and
  a location server that stores location information and calculates locations based at least partly on data associated with at least one aerial platform and at least one ground device, the location server accessible via the distributed network.

15. The system of claim 14, wherein each aerial platform transmits a pilot signal that is able to be received by the ground devices in the set of ground devices.

16. The system of claim 15, wherein each ground device that is able to receive the pilot signal calculates at least one of a time of arrival (TOA) value and a round trip delay (RTD) value and the location server is able to determine a location of at least one aerial platform in the set of aerial platforms by triangulating the calculated values.

17. The system of claim 14, wherein each ground device transmits a pilot signal that is able to be received by the aerial platforms in the set of aerial platforms.

18. The system of claim 17, wherein each aerial platform that is able to receive the pilot signal calculates at least one of a time of arrival (TOA) value and a round trip delay (RTD) value and the location server is able to determine a location of at least one ground device in the set of ground devices by triangulating the calculated values.

19. The system of claim 14, wherein at least one ground device in the set of ground devices is a mobile phone.

20. The system of claim 14, wherein:
  each aerial platform in the set of aerial platforms periodically transmits an augmented pilot signal using at least one of higher power and longer duration compared to nominal levels; and
  each ground device is configured to search for the augmented pilot signal if a nominal pilot signal is not detected.

* * * * *